US011913606B2

(12) United States Patent
Bødker et al.

(10) Patent No.: US 11,913,606 B2
(45) Date of Patent: Feb. 27, 2024

(54) LARGE-SCALE HYDROGEN REFUELING STATION

(71) Applicant: Nel Hydrogen A/S, Herning (DK)

(72) Inventors: Peter Bødker, Herning (DK); Claus Due Sinding, Herning (DK); Jacob Appelt Vibe Svendsen, Silkeborg (DK); Thomas Christian Francois Charbonneau, Toulouse (FR)

(73) Assignee: NEL HYDROGEN A/S, Herning (DK)

( * ) Notice: Subject to any disclaimer, the term of this patent is extended or adjusted under 35 U.S.C. 154(b) by 0 days.

(21) Appl. No.: 17/416,066

(22) PCT Filed: Jan. 16, 2020

(86) PCT No.: PCT/DK2020/050020
§ 371 (c)(1),
(2) Date: Jun. 18, 2021

(87) PCT Pub. No.: WO2020/147911
PCT Pub. Date: Jul. 23, 2020

(65) Prior Publication Data
US 2022/0003361 A1 Jan. 6, 2022

(30) Foreign Application Priority Data
Jan. 18, 2019 (DK) .......................... PA 2019 70036

(51) Int. Cl.
*F17C 5/02* (2006.01)
*F17C 5/06* (2006.01)

(52) U.S. Cl.
CPC .................. *F17C 5/02* (2013.01); *F17C 5/06* (2013.01); *F17C 2205/0326* (2013.01);
(Continued)

(58) Field of Classification Search
CPC ...... F17C 5/02; F17C 5/06; F17C 2205/0326; F17C 2205/05; F17C 2221/012;
(Continued)

(56) References Cited

U.S. PATENT DOCUMENTS 9,284,178 B2 * 3/2016 Donnelly .................. B60S 5/02
2003/0164202 A1 * 9/2003 Graham ..................... F17C 5/06
141/98
(Continued)

FOREIGN PATENT DOCUMENTS

EP 3249281 A1 11/2017
WO 03059742 A1 7/2003
(Continued)

OTHER PUBLICATIONS

International Search Report for corresponding application PCT/DK2020/050020 filed Jan. 16, 2020; dated Apr. 14, 2020.
(Continued)

*Primary Examiner* — Timothy P. Kelly
*Assistant Examiner* — Stephanie A Shrieves
(74) *Attorney, Agent, or Firm* — CANTOR COLBURN LLP (57) ABSTRACT

The invention relates to a large-scale hydrogen refueling station comprising at least one supply storage, a plurality of compressor modules comprising a local controller, a plurality of dispenser modules, and a hydrogen production system comprising a hydrogen production system controller mutually connected by one or more flow paths. Wherein one of the controllers facilitates control of valves and thereby flow of hydrogen gas in the flow paths between the at least one supply storage, compressor modules, dispenser modules and hydrogen production system. Wherein the control of the valves enables flow of hydrogen gas in at least three of the flow paths simultaneously.

19 Claims, 5 Drawing Sheets

(52) U.S. Cl.
CPC .... *F17C 2205/05* (2013.01); *F17C 2221/012* (2013.01); *F17C 2227/0157* (2013.01); *F17C 2227/043* (2013.01); *F17C 2250/032* (2013.01); *F17C 2250/034* (2013.01); *F17C 2250/043* (2013.01); *F17C 2250/0626* (2013.01); *F17C 2250/0636* (2013.01); *F17C 2260/013* (2013.01); *F17C 2260/025* (2013.01); *F17C 2265/063* (2013.01); *F17C 2265/065* (2013.01); *F17C 2270/0139* (2013.01); *F17C 2270/0184* (2013.01)

(58) Field of Classification Search
CPC ........ F17C 2227/0157; F17C 2227/043; F17C 2250/032; F17C 2250/034; F17C 2250/0626; F17C 2250/0636; F17C 2260/013; F17C 2260/025; F17C 2265/063; F17C 2265/065; F17C 2270/0139; F17C 2270/0184; Y02E 60/32
USPC .................................................. 141/4; 222/3
See application file for complete search history.

(56) References Cited

U.S. PATENT DOCUMENTS

| | | | | |
|---|---|---|---|---|
| 2004/0118476 A1* | 6/2004 | Borck | ........................ | F17C 5/06 141/4 |
| 2005/0000802 A1* | 1/2005 | Hobbs | ........................ | C01B 3/34 204/277 |
| 2006/0236608 A1* | 10/2006 | Khan | ........................ | F17D 1/04 48/190 |
| 2009/0032135 A1* | 2/2009 | Iida | ........................ | B60L 1/003 141/69 |
| 2014/0290791 A1* | 10/2014 | Isom | ........................ | B65B 3/12 141/4 |
| 2014/0352840 A1* | 12/2014 | Blanchet | ................... | F17C 5/06 141/4 |
| 2015/0090364 A1* | 4/2015 | Elgowainy | ................ | F17C 5/06 141/4 |
| 2016/0116113 A1* | 4/2016 | Mrowzinski | .............. | F17C 5/06 222/3 |
| 2016/0273711 A1* | 9/2016 | Hwang | ...................... | F04D 17/12 |
| 2017/0045182 A1* | 2/2017 | Poorman | .................. | F17C 5/06 |
| 2017/0146194 A1* | 5/2017 | Youlio | ..................... | F17C 13/04 |
| 2017/0336028 A1* | 11/2017 | Cohen | ..................... | F17C 13/04 |
| 2018/0080608 A1* | 3/2018 | Reddi | ....................... | F17C 5/06 |
| 2023/0204159 A1* | 6/2023 | Werlen | .................... | F17C 7/02 141/5 |

FOREIGN PATENT DOCUMENTS

| | | | | |
|---|---|---|---|---|
| WO | 2017158762 A1 | 9/2017 | | |
| WO | 2019009794 A1 | 1/2019 | | |
| WO | WO-2019009794 A1 * | 1/2019 | ................ | F17C 5/04 |

OTHER PUBLICATIONS

Written Opinion for corresponding application PCT/DK2020/050020 filed Jan. 16, 2020; dated Apr. 14, 2020.

* cited by examiner

LARGE-SCALE HYDROGEN REFUELING STATION

TECHNICAL FIELD

The disclosure relates to a large-scale hydrogen refueling station and a method of controlling such large-scale hydrogen refueling station.

BACKGROUND

In the art it is known to connect supply storage, compressor and dispenser to refuel a light-duty vehicle. The capacity of such known refueling station is not sufficient to refuel a plurality of heavy-duty vehicles. The problem of refueling a plurality of heavy-duty vehicles is solved by the present disclosure.

BRIEF SUMMARY

The disclosure relates to a large-scale hydrogen refueling station comprising at least one supply storage, a plurality of compressor modules each comprising a local controller, a plurality of dispenser modules, and a hydrogen production system comprising a hydrogen production system controller wherein the at least one supply storage, the plurality of compressor modules, the plurality of dispenser modules and the hydrogen production system are mutually connected by one or more flow paths. Wherein one of the controllers facilitates control of valves and thereby flow of hydrogen gas in the flow paths between the at least one supply storage, compressor modules, dispenser modules and/or hydrogen production system. Wherein the control of the valves enables flow of hydrogen gas in at least three of the flow paths simultaneously.

This is advantageous in that it has the advantageous in that it is possible to perform pressure consolidation of one pressure storage/vessel, at the same time as a vehicle is refueled from another pressure storage/vessel. Thereby is obtained a hydrogen refueling station which, compared to known hydrogen refueling stations, has a higher pressure/higher State of Charge of supply storage/vessels and hence is able to deliver a faster refueling of more vehicles within the same time period.

Further this is advantageous in that such large-scale hydrogen refueling station enables refueling a plurality of vehicles simultaneously independent of pressure in the supply storage and further allows to perform pressure consolidation at the same time as at least one of the refuelings are performed.

According to an embodiment of the disclosure the large-scale hydrogen refueling station comprises at least one supply storages, at least three compressor module and at least three dispenser modules.

This is advantages in that it has the effect, that it is possible to perform a refueling of a vehicle vessel and perform pressure consolidation during the same period of time i.e. simultaneously. In fact, several vehicles can be refueled simultaneously with pressure consolidation of several vessels of the supply storages and hydrogen production.

According to an embodiment of the disclosure, the compressor of the compressor module is a variable speed compressor.

This is advantages in that it has the effect, that it is possible to reduce the capacity of the compressor and thereby the power consumption leading to a reduced cost of operation of the compressor.

According to an embodiment of the disclosure, the valves are controlled to establish: an inlet flow path between at least one supply storage and at least one compressor module, an outlet flow path between at least one compressor module and at least one dispenser module, a consolidation flow path between at least one compressor module and at least one supply storage, a dispense flow path between at least one supply storage and at least one dispenser module. Wherein the local controller is controlling the valves so as to facilitate flow of gas in at least three of inlet flow path, outlet flow path, consolidation flow path or dispense flow path simultaneously.

According to an exemplary embodiment, the local controller, during the first part of the refueling, is configured to control the valves of a particular compressor module to facilitate flow of hydrogen via the dispensing flow path from a vessel of the at least one supply storage to a dispenser module associated with the specific compressor module and furthermore configured to control the compressor and the valves to facilitate flow of hydrogen in the inlet flow path and in the consolidation flow path and thereby facilitating pressure consolidation of a vessel and refueling of a vehicle vessel simultaneously.

This is advantageous in that it has the effect, that a specific compressor module can be operated more efficient in that both pressure consolidation and refueling can be made simultaneously.

According to an embodiment of the disclosure, the valves are controlled to establish a first supply flow path between the hydrogen production system and at least one supply storage, and/or a second supply flow path between the hydrogen production system and at least on compressor module. Wherein the hydrogen production system controller and/or one or more local controllers are controlling the valves so as to facilitate flow of gas in the first supply flow path or in the second supply flow path simultaneously with flow of gas in at least one of the inlet flow paths, outlet flow path, consolidation flow path or dispense flow path.

According to an embodiment of the disclosure, at least one vessel of the at least one supply storage is predefined as low-pressure storage and at least two vessels of the at least one supply storage is predefined as medium-pressure storages, This is advantageous in that it has the effect, that it is possible to consolidate pressure in one vessel of a supply storage at the same time as another vessel of the same supply storage is used as gas source for a refueling.

This is further advantageous in that it has the effect, that the hydrogen production system may supply low-pressure hydrogen to a "buffer storage" which when a compressor has time and/or need for medium or high-pressure gas is present and/or energy price is as desired can consolidate this low-pressure gas into medium pressure gas storage.

According to an embodiment of the disclosure, the low-pressure is defined as being in the range of 0 bar-300 bar and the medium pressure is defined as being in the range of 150 bar-500 bar, wherein the predefined medium pressure is always equal to or higher than the predefined low-pressure. In embodiments the difference between low-pressure and high-pressure is between 150 bar and 300 bar such as e.g. 200 or 250 bar.

According to an embodiment of the disclosure, the central controller is controlling the valves so that a first inlet flow path is connecting a first vessel of the at least one supply storage to a first compressor module, a first outlet flow path is connecting the first compressor module to a first dispenser module, a second inlet flow path is connecting a second vessel of the at least one supply storage and a compressor module and a first consolidation flow path is connecting the second compressor module to a third supply storage.

This is advantageous in that it has the effect, that flow of gas is established in four flow paths at the same time. The second supply storage is preferably the low-pressure storage. One vessel of the third supply storage may be used as gas source for a refueling at the same time as a second vessel of the third supply storage may be used as gas receiver in a consolidation process.

According to an embodiment of the disclosure, one of the vessels (13) of the at least one supply storages is defined as a low-pressure supply storage and wherein the first supply flow path is only connecting the hydrogen production system and the low-pressure vessel (13).

Having one supply storage defined as a low-pressure storage connected to the hydrogen production system is advantages in that it can be used as buffer for the production. Further, it is advantageous in that the requirements to e.g. compressor of the hydrogen production system can be reduced. The low-pressure supply is used as supply for the medium pressure storage or compressor modules.

According to an embodiment of the disclosure a first supply storage vessel of a supply storage serves as gas input to one inlet flow path to a first compressor module simultaneously with a second vessel of the supply storage serving as gas receiver of a consolidation flow path from a second compressor module.

This is advantageous in that it has the effect, that it adds flexibility to the system to be able to refuel from one vessel and consolidate pressure in another vessel of the same supply storage.

According to an embodiment of the disclosure, the hydrogen production system is producing hydrogen when the pressure in the at least one supply storage vessel is below a plant pressure threshold.

This is advantageous in that it has the effect of ensuring sufficient pressure to comply with expected future refueling demands. It is an aim of the present disclosure to always be able to initiate a refueling with maximum pressure in the supply storage. A plant pressure threshold may be a pressure of between 0 and 200 bar but could also be a state of charge threshold ensuring enough hydrogen in the vessels to comply with expected future refueling demand.

According to an embodiment of the disclosure, the hydrogen production system is producing hydrogen when the energy price is below an energy price threshold value if the pressure in all supply storage vessels is above the plant pressure threshold.

This is advantageous in that it has the effect, that when there is sufficient pressure/hydrogen in the supply storages, then operation costs are reduced. In this situation hydrogen is only produced when cost of energy available on the utility grid supplying the hydrogen production system is below a predefined energy price threshold. Such energy price threshold may vary day by day and sometimes hour by hour depending on local electricity marked.

The energy price threshold is determined based on local energy price level and can be adjusted over time as the energy prices changes. The plant pressure threshold is a measure of how full the supply storages are i.e. if the total capacity in the supply storages are empty, the plant pressure is 50% hence if the plant pressure threshold is 50%, then production of hydrogen will be initiated disregarding energy prices if the plant pressure drops to 49%.

According to an embodiment of the disclosure, a first part of a refueling is made directly from one of the supply storages and a second part of the refueling is made via a compressor module. Wherein the shift between the first and the second part is made when the flow in the dispense flow path is estimated to be lower than the flow generated by the compressor module in the output flow path.

This is advantageous in that it has the effect that the refueling is made as fast as possible. The flow generated in the dispense flow path due to the pressure difference between the pressure in the vehicle vessel and the pressure in the supply storage is higher than the flow generated by the compressor.

According to an embodiment of the disclosure, a main controller facilitating broadcasting a control reference of the list comprising: related to energy consumption, related to maintenance, related to pressure consolidation to the hydrogen production system controller and/or local controllers. Broadcasting control reference such as increase energy consumption if the energy prices are low and thereby intensify pressure consolidation, taking one compressor module or dispenser module out of operation for maintenance purpose is advantageous in that overall operation can be optimized with respect to efficiency and cost. Further, it is noted, that the main controller can be a or include a SCADA (SCADA; Supervisory Control And Data Acquisition) system for monitoring and simple control operations of the large-scale refueling station.

According to an exemplary embodiment, the simultaneous flow in at least three of the flow paths is controlled by one local controller so as to enable one compressor module to perform pressure consolidation of a vessel simultaneously with refueling a vehicle tank.

According to an exemplary embodiment, all valves controllable by the local controller required to control the flow in at least three of the flow paths is physically located at part of the compressor module.

In addition to all the valves controllable by the local controller additional safety valves may be provided. Such safety valves may e.g. be mechanically controlled valves that opens at a predefined threshold pressure. A valve in front of each vessel may also be provided e.g. to be able to exclude a vessel if it is to be maintained, replaced, etc. Providing all valves in the compressor module is advantageous in that it is easier to "plug and play" an additional compressor module to the large-scale refueling system if needed in that no central control has to be updated.

According to an exemplary embodiment, the ratio of compressor modules to supply storage is at least 3 to 1. This is advantageous in that it has the effect, that costs are reduce in that three or more compressor modules can use the same supply storage. Further, it is advantageous in that it has the effect, that a refueling can be expected to take the same time independent of which dispenser and thereby indirectly which compressor module that is chosen for a refueling. Having only one supply storage to three or more compressor modules is at least partly possible due to the high-performance compressors of the compressor modules i.e. compressors having oval compression chambers.

According to an exemplary embodiment, a vehicle approaching the large-scale refueling station is identified and guided to an available dispenser by the master controller. This is advantageous in that it has the effect, that the vehicle is guided to the most efficient dispenser e.g. a dispenser which is not already using its compressor to refuel another vehicle. Further, it enables the master controller to plan wear of the modules as desired i.e. equally or using one particular compressor module or dispenser module more than other. The master controller may also be referred to as a supervisory system or supervisory controller in the embodiment where it is not directly controlling the position of the valves required to perform pressure consolidation and refueling.

According to an exemplary embodiment, the identification includes registering at least one of the list comprising: vehicle type, vehicle tank size, state of charge of the vehicle tank, pressure of gas in the vehicle tank and temperature of the vehicle tank.

According to an exemplary embodiment, the master controller is configured to guide the vehicle to an available dispenser based on information of at least one of the list comprising: available dispensers and time of arrival of the vehicle at the large-scale refueling station.

Moreover, the disclosure relates to a method of refueling a vehicle vessel from a large-scale refueling station comprising at least one supply storage, a plurality of compressor modules each comprising a local controller, a plurality of dispenser modules and a hydrogen production system comprising a hydrogen production system controller wherein the at least one supply storage, the plurality of compressor modules, the plurality of dispenser modules and the hydrogen production system are mutually connected by one or more flow paths. The method comprising the following steps: connecting the vehicle vessel to a dispenser module, starting the refueling from a user interface, initiating flow of hydrogen gas from a supply storage via a dispense flow path during a first part of the refueling, continuing the flow of hydrogen via a compressor module during second part of the refueling, and disconnecting the dispenser module from the vehicle vessel when a target pressure is reached. Wherein the refueling is initiated by a user who, via the user interface, activates the local controller of the compressor module associated with the dispensing module to which the vehicle vessel is connected, based here on the local controller change status of one or more valves to facilitate flow of gas via a dispense flow path during a first part of the refueling and via an outlet flow path during a second part of the refueling.

In an exemplary embodiment, the user interface may be an app on a smartphone, on the dispenser or on both. It should be mentioned, that the refueling may include only one part if the pressure in a vessel of the supply storage is higher that the target pressure of the vehicle vessel. In this situation the complete refueling can be provided by the so-cascade method which is solely based on pressure equalization between one or more vessels of the supply storage and the vehicle vessel.

According to an exemplary embodiment, the local controller, during the first part of the refueling furthermore controls the valves and the compressor to perform pressure consolidation of a vessel. Simultaneously refueling and pressure consolidation allows more efficient control of the large-scale and thereby a faster return of investment.

According to an embodiment of the disclosure, a first compressor module is used for refueling of a vehicle vessel and simultaneously a second compressor is used for pressure consolidation between vessels of the at least one supply storages.

According to an embodiment of the disclosure, simultaneously a third compressor module is used for moving pressure from a low-pressure storage connected to the hydrogen production system to a medium or high-pressure supply storage or to a vehicle vessel.

Vehicle should preferably be understood as a heavy-duty vehicle but could be any type of vehicle. Further, vehicle is a fuel cell vehicle.

The user interface could be a simple device communicating with e.g. a portable device such as a smartphone. in this way most of the user interface is on the smartphone which is communicating with the dispenser or compressor module or main controller to initiate the refueling.

The continuing of the refueling via the compressor module may be at reduced speed of the compressor and from the same or another supply storage.

The target pressure may alternatively be a target state of charge of e.g. 100%.

The first, second and third compressor modules are able to be used in any of the mentioned refueling, consolidation and moving of gas processes. This is advantageous in that it has the effect, that the large-scale refueling station is able to be operated in a flexible manner and thereby always be ready for a high frequency of refuelings at a low operation cost.

According to an exemplary embodiment, the method further includes the step of identifying and guiding a vehicle approaching the large-scale refueling station to an available dispenser.

According to an exemplary embodiment, the simultaneous flow in at least three of the flow paths is controlled by one local controller so as to enable one compressor module to perform pressure consolidation of a vessel of the supply storage simultaneously with refueling a vehicle tank.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
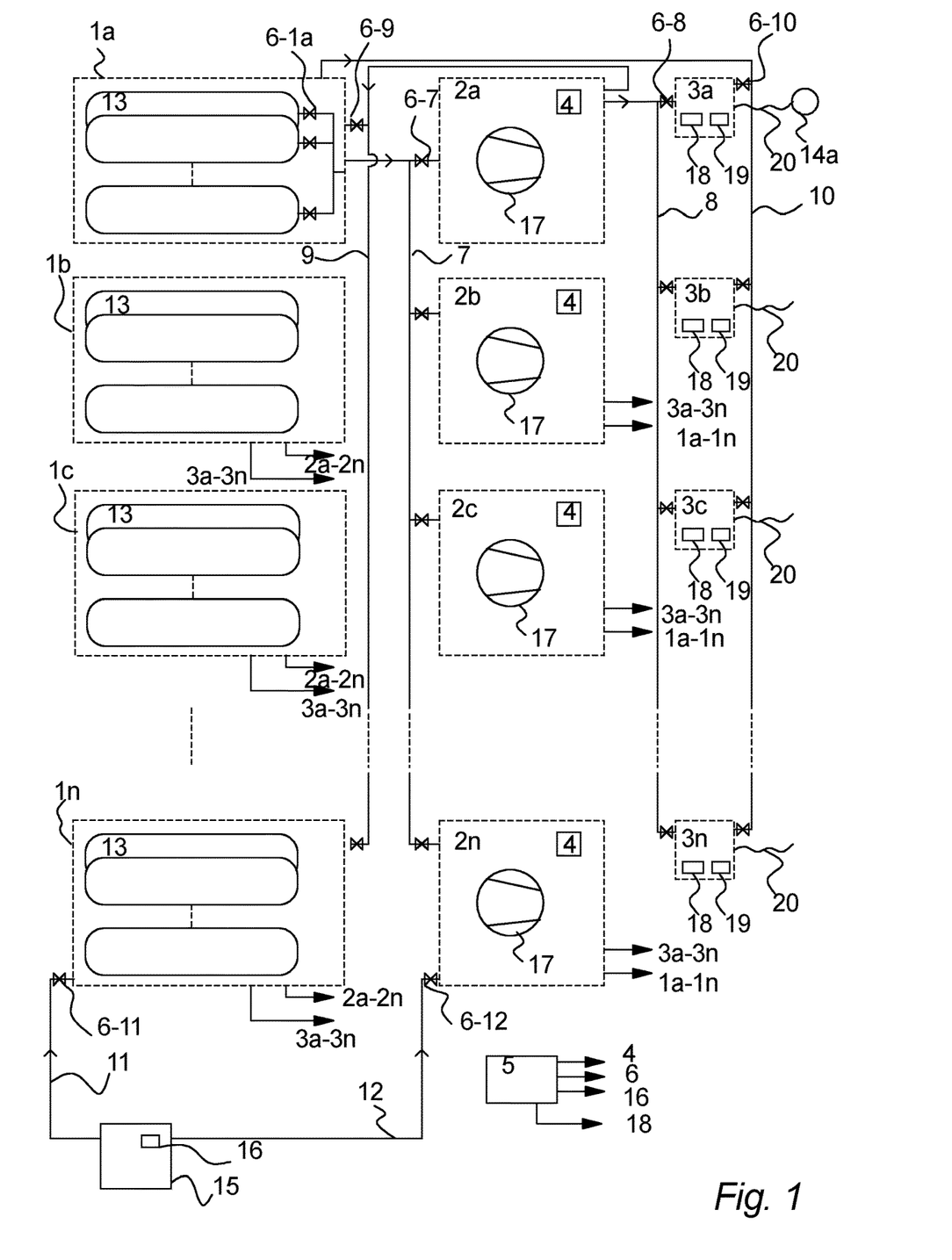
FIGS. 1 and 5 illustrates an overall view of the large-scale refueling station.
Figure 5:
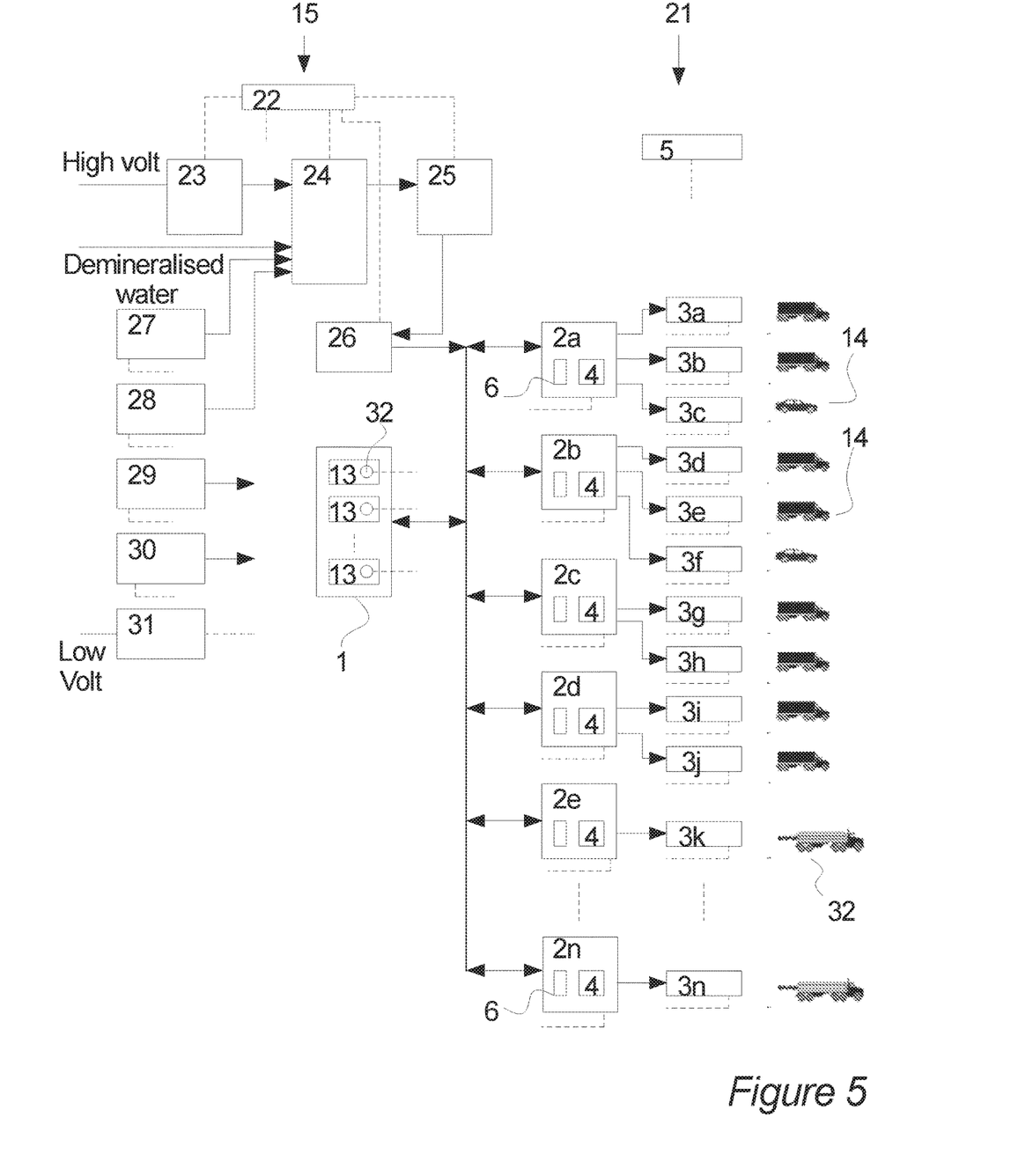

FIG. 1 illustrates an embodiment of the disclosure, a large-scale hydrogen refueling station mainly for refueling of heavy-duty vehicle, with four hydrogen supply storages 1*a*-1*n*, four compressor modules 2*a*-2*n* and four dispensers 3*a*-3*n*. It should be noted, that there do not have to be a 1:1:1 relationship between the number of supply storages 1, compressors 2 and dispensers 3 as illustrated in FIG. 1. This is indicated on FIG. 2 where only one supply storage 1 is illustrated with a plurality of vessels 13. The vessels 13 are divided in several medium pressure sections MPI-MPIII and a low-pressure section LP. Again, both the number of vessels 13 in a storage 1 and the configuration of the vessels in low, medium and/or high sections are configurable according to the requirements to the large-scale refueling station. This is also indicated in FIG. 5 where only one storage 1 is illustrated whereas six compressor modules 2 and twelve dispensers are illustrated.

In addition, FIG. 1 illustrates a hydrogen production system 15. Note that more valves than illustrated may be included to obtain the total number of combination of connections (flow paths) between the modules. Also note, that in exemplary embodiments, especially where the number of supply storage 1 is less than the number of compressor modules 2, an advantageous location of the valves 6 is in relation to the individual compressor modules 2. Such embodiment is not illustrated but could as mentioned be an advantageous location of the valves 6 also with respect to installation, control, service and maintenance and modularization of the large-scale refueling station.

A supply storage 1 typically comprises a plurality of vessels 13 but may be implemented as one single vessel. The vessels 13 are typically Type 1 vessels designed to holding a gas at a pressure of at least 200 bar. Typically, the supply storages are stationary. In a preferred embodiment, at least one supply storage is defined as a low-pressure storage and the rest as medium pressure storage. In an embodiment, the low-pressure region is defined as a range between 0 and 200 bar whereas the medium pressure region is defined as a range between 200 and 500 bar. These ranges can be change from site to site and should therefore only serve as examples and not limitations in the present disclosure. Further, high-pressure storages may also be used where hydrogen gas is stored at pressures above 500 bar up to 1000 bar.

According to a specific embodiment, the hydrogen production system 15 is designed to deliver hydrogen at a pressure of 200 bar. If compressor capacity is available this 200 bar hydrogen could be delivered to any of the supply storages 1. However, this cannot be guaranteed and therefore in this embodiment a low-pressure supply storage is defined for sole or at least main storage of hydrogen gas from the production system 15. Here the hydrogen is stored until compressor capacity is available for consolidating it in other storages 1 or supply directly to a vehicle.

It should be mentioned that in addition to the hydrogen production system 15, a movable supply preferably in the form of a truck trailer may be connected to one or more of the supply storages 1. This is especially relevant in situations where the hydrogen production system 15 is not producing in its full capacity or being maintained.

The consolidation is made to what in this specific embodiment is defined as medium pressure storage at a pressure of 500 bar. The 500 bar limit is defined based on a calculation of the price of storing an amount of hydrogen at a given pressure. It may be even factor three more expensive to store gas at 1000 bar (example of high-pressure) compared to storage at 500 bar (example of medium pressure). With this said the pressure in the vessels 13 of the supply storages 1 may be increased up to maybe 1000 bar if this is required to comply with refueling demands which has the highest priority in the operation of the large-scale refuelings station.

A compressor module 2 typically comprises elements including compressor, cooling system, pressure and temperature sensor, leakage sensors, etc. all locally controlled by a local controller 4. A compressor module 2 is also referred to as a station module in that it can be operated individually as an independent refueling station. i.e. the large-scale refueling station comprises a plurality of independent hydrogen refueling stations. The local controller 4 is an autonomous controller controlling the compressor module elements to ensure a desired pressure, temperature, flow, etc. of the gas leaving the compressor module 2 via the outlet flow path 8 or consolidation flow path 9. The local controller 4 may control the compressor module in response to setpoint or operation values received from/determined from a central controller 5.

The local controller may be a programmable logic controller.

Preferably the compressor 17 is a variable speed compressor meaning that the speed of the diaphragm/piston of the compressor can vary. This is leading to a more flexible control of the individual compressor modules 2 and thereby of the entire large-scale refueling station. Normally, it is the local controller 4 which is controlling the speed of the compressors based on a reference from the main controller 5, dispenser controller 18, pressure measurements from vessels of the supply storages 1, etc. However, the plurality of local controllers 4 may also communicate among themselves and a first takes it share of a refueling/consolidation job leaving a remaining share of the job to the remaining. This mutual control of which compressor module that is working on which task may be determined from the master controller or among the local controllers.

On the output (outlet flow path 8) from the compressor 2 the pressure of hydrogen may vary from 0 bar to desired pressure in vehicle vessel 14 at the end of the refueling, which typically is between 350 and 900 bar. Typically, the pressure in the outlet flow path 8 is higher than the minimum pressure in the supply storage 1 defined as medium pressure storages i.e. above 150-200 bar, but preferably (with reference to the example above) above the 500 bar. Accordingly, the pressure in the outlet flow path 8 is defined as high-pressure during a refueling.

A dispenser 3 typically comprises a user interface via which a user can communicate with one or more of the local controllers 4 either directly or via the central controller 5. As a result of the communication, the user is allowed to refuel a vehicle tank with a gaseous fuel, preferably hydrogen. Further, the dispenser 3 also comprise a dispenser controller 18, hose 20 and nozzle for connecting to the vehicle tank 14 and thereby allowing flow of hydrogen gas into the vehicle vessel 14. The dispenser controller 18 may control a dispenser cooling system 19 if such is present based on setpoints received from a local controller or based on input from sensors. The dispenser controller 18 is preferably a slave controller to the local controller 4 of which the dispenser is connected to.

If a dispenser cooling system 19 is present may be located inside or outside the physical dispenser and main purpose hereof is to ensure correct temperature of the hydrogen gas prior to entering the vehicle vessel. Such temperature adjustment may be necessary due to an increase caused e.g. by valves including pressure at pressure regulating valves, pipes reaching ambient temperature, etc.

The dispenser controller 18 is preferably controlling the refueling according to setpoints or reference values receive from the local controller of the compressor module the dispenser module is fluidly connected to. Hence, preferably the dispenser controller is a slave controller to the local controller which acts as master controller. A refueling strategy is typically a cascade like refueling strategy where the vessel 13 with the lowest pressure of the supply storages 1 (preferably of the medium pressure storages) are used as first gas source, then the second lowest, etc. until pressure consolidation between the vessel 13 having the highest pressure and the vehicle vessel 14 is reached. From this point one of the compressor modules 2 are used to increase the pressure further to the desired end pressure in the vehicle vessel 14.

In one embodiment of the disclosure, a refueling is controlled by a local controller 4, but it may also be controlled (at least partly) by a dispenser controller 4 or the main controller 5.

A hydrogen production system 15 is preferably implemented as an electrolyser in the form of an Alkaline or a PEM electrolyser or a combination hereof. In addition to the electrolyser part, the hydrogen production system 15 also comprise compressors, storage vessels, etc. This enables the hydrogen production system to output hydrogen gas with a pressure defined in the so-called low-pressure region which in this application is defined as a pressure between 0 and 200 bar. It should be mentioned that this definition may vary from site to site and between station/electrolyser OEMs and should thus not be limiting to the scope of the disclosure. The hydrogen may also be produced by other systems e.g. from natural gas. The hydrogen production is controlled by a hydrogen production system controller 16 in response to setpoint or operation values received from/determined by the central controller 5. Alternative, predefined threshold values are used by the controller 16 to control when the production should be initiated or stopped. Such threshold values may be pressure in the low-pressure storage, energy price, or the like.

The hydrogen production system is preferably located physically at the same location as the supply storage, compressor and dispenser modules. However, it may also be located external to the location of these modules. If e.g. it is considered beneficial to locate the hydrogen production system close to a wind power plant or solar plant. If an existing electrolyser is located a distance from the location of the plant the electrolyser can be directly connected via pipis and still be considered as part of the large-scale hydrogen refueling station. Alternatively, the hydrogen gas can also be transported via tube trailer instead of the illustrated flow paths 11, 12.

Hence in a preferred embodiment of the present disclosure, the hydrogen production system 15 delivers 200 bar hydrogen gas to the supply storages 1 defined as low-pressure storage when the pressure in vessels hereof is below a threshold value. Alternatively, the produced hydrogen gas is delivered directly to the compressor modules 2 or dispenser module 3.

With reference to FIG. 1 the compressor modules 2 and the dispensers 3 are located downstream the supply storages 1. The dispenser module 3 is located downstream the compressor module 2. Hence, there is a fluid communication channel (referred to as the dispense flow path 10) leading gas from each of the supply storages 1a-1n to each of the dispenser modules 3a-3n. Further, there is a fluid communication channel (referred to as inlet flow path 7) leading gas from each of the supply storage 1a-1n to each of the compressor modules 3a-3n. Further, there is a fluid communication channel (referred to as consolidation flow path 9) leading gas from each of the compressor modules 2a-2n to each of the supply storages 1a-1n. Finally, there is a fluid communication channel (referred to as outlet flow path 8) leading gas from each of the compressor modules 2a-2n to each of the dispenser modules 3a-3n.

Accordingly, the modules (supply storage, compressor module, dispenser module and hydrogen production system) are mutual connected i.e. physical pipes are fluidly connecting these modules. Hence, thereby it is possible to guide hydrogen gas in the pipes between the modules.

The hydrogen production system 15 is via a first supply flow path 11 supplying hydrogen to at least one supply storages defined as a low-pressure supply storage (on FIG. 1 denoted 1n). When the pressure threshold is reached (or before) pressure equalization is obtained between the hydrogen production system 15 and the low-pressure supply storage 1n, the valve 6-15.1 is closed and the production is stopped. The production of hydrogen may be continued when the first supply flow path 11 is closed, if the gas can be transferred to one of the compressor modules 2 via the second supply flow path 12. The receiving compressor module 2 is then increasing the pressure of the gas received and via a consolidation flow path 9 delivering the pressurized gas to one of the medium pressure storages 1.

The flow of gas in the in the flow paths 7, 8, 9, 10, 11, 12 is controlled by valves 6. Valves of the inlet flow path are denoted 6-7, valves of the outlet flow path are denoted 6-8, valves of the consolidation flow path are denoted 6-9, valves of the dispense flow path are denoted 6-10, valves in the first supply flow path are denoted 6-11 and valves in the second supply flow path are denoted 6-12. The position of the valves is controlled by the central controller 5, local controller 4 or dispenser controller 18. The status of the valves 6 is thereby controlling if a compressor module 2 is used in a refueling process or in a pressure consolidation process, if a supply storage is supplying gas to the inlet flow path 7 or directly to a dispenser 3 via the dispense flow path 10, etc.

It should be mentioned, that valves (denoted 6-1) controlling flow from vessels 13 inside the supply storages 1 may also be controlled by the central controller local controller 4 or dispenser controller 18. The control of these valves 6-1 is used to perform pressure consolidation within a supply storage, determine which of a plurality of vessels 13 of the supply storage 1 that has the deliver gas to one of the inlet or dispense flow paths 7, 10 or receive gas from the consolidation flow path 9.

Preferably the valves 6 are pneumatic valves and therefore as far as possible located as close to the compressor modules 2 as possible in that here compressed air is available. Alternatively, an air compressor is also provided for supplying instruments such as valves (see FIG. 5). Therefore, the compressor modules 2 preferably comprises valve panels at least with valves 6-1 controlling flow between vessels 13 of the supply storages 1.

The embodiment illustrated in FIG. 1 (and FIG. 5) illustrates the highest degree of flexibility that can be added to the large-scale refueling station of the present disclosure, namely that all supply storages 1 is connected to all compressor modules 2 and all dispenser modules 3. Hence, the embodiment illustrated in FIG. 1 facilitates flow of gas in the large-scale refueling station between any combination of these modules. However, less flexible configurations are still within the scope of the disclosure. An example could be an individual supply storage 1 may be dedicated as supply storage to one dispenser 3 via one dedicated compressor module 2. Another example is the lower pressure storage 1n which in an embodiment is the only supply storage having a flow path to the hydrogen production system 15. Hence, any configuration of flow paths 7-12 between supply storage 1, compressor module 2, dispenser 3 and hydrogen production system 15 is in theory possible to implement within the scope of the present disclosure.

The choice of configuration (i.e. which supply storage is supplying which dispenser module) may be decided by a control strategy which can be based on a predetermined priority given to each of the modules ("modules" may be used as common reference to supply storage 1, compressor module 2, dispenser module 3 and hydrogen production system 15). Based here on a preferred configuration is automatically chosen according to the priority and if the preferred configuration is not possible e.g. because the first priority compressor is busy, the second priority compressor is used instead.

The choice of configuration may also be determined from a random control strategy or based on a strategy takin into account previous use to ensure that each individual supply storage is filled/emptied the same number of times, each individual compressor is running the same number of hours, etc. e.g. leading to an equal wear of e.g. compressor modules, energy price, etc.

The fact, that the large-scale refueling station comprises a plurality of identical (at least functional) modules make it possible to load the modules so that e.g. the compressors need maintenance at the same time or at different times depending on maintenance strategy.

The large-scale refueling station and thereby the compressor modules are controlled according to at least three main control strategies. The first control strategy is a refueling strategy aiming at filling a vessel 14 of a vehicle as fast as possible which is described with reference to FIG. 2, the second is to consolidate the pressure in one or more of the vessels 13 of the supply storage 1 which is disclosed with reference to FIG. 3 and the third is to consolidate pressure of/move gas from the low-pressure storages produced by the hydrogen production system 15 to medium pressure supply storages 1 which is disclosed with reference to FIG. 4. The control strategies are described with reference to FIGS. 2, 3 and 4 only with the valves 6 illustrated on FIG. 1 needed to explain the control strategies.

Figure 2:
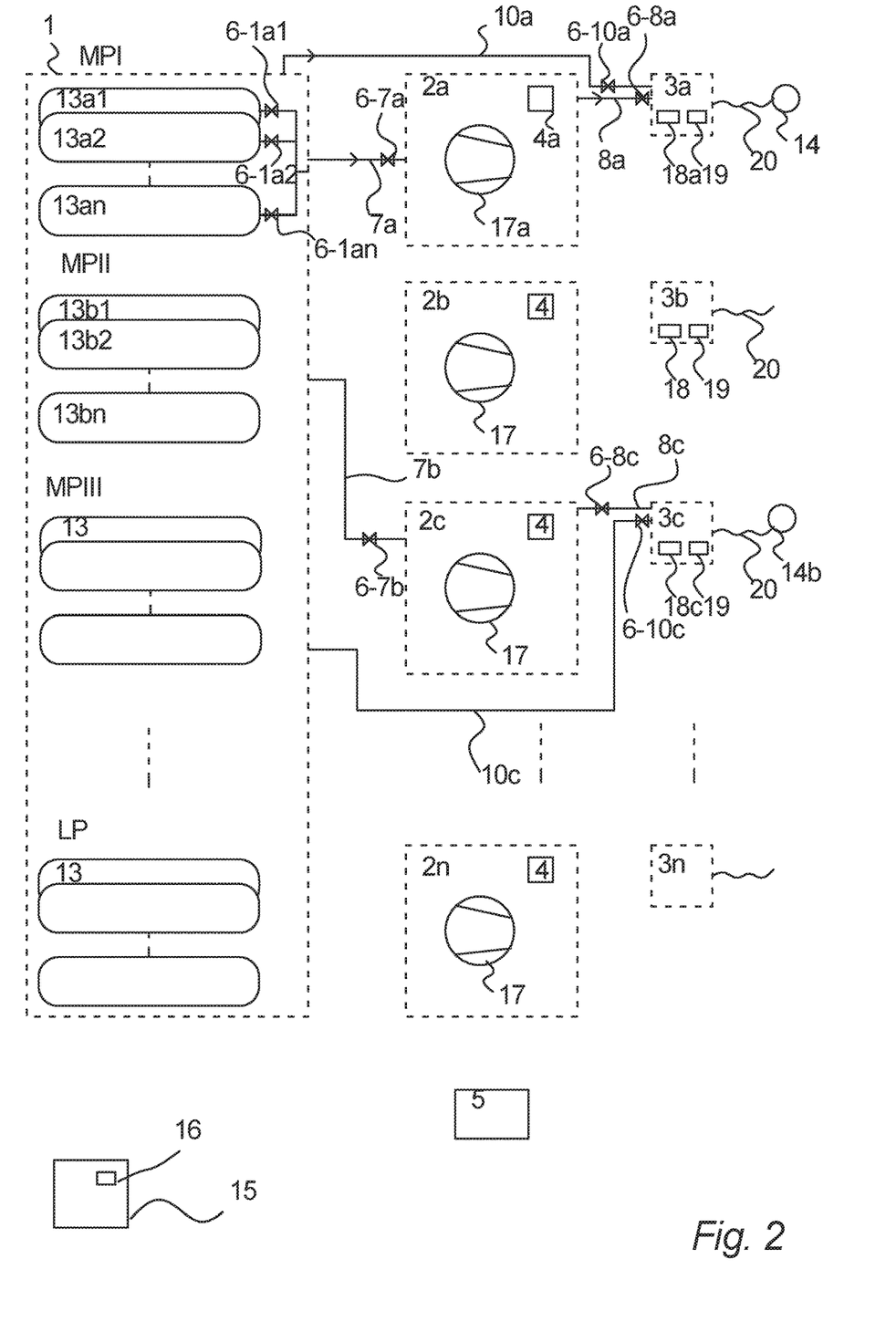
FIGS. 2-4 illustrates configuration of gas flow paths according to first, second and third main control strategy.

A refueling of a vehicle vessel 14a initiated by a user of dispenser module 3a is according to FIG. 2, established during a first period of time, from the dispense flow path 10a between supply storage 1a and dispenser 3a. The dispense flow path 10a is opened for gas flow by opening one or more of the valves 6-1a1, 6-1a2, 6-1a3 and open valve 6-10a while keeping valve 6-7a closed.

The duration of the first period of time is determined by the difference in pressure in the vessels 13 of supply storage 1a and the vehicle vessel 14a. If there is a huge pressure difference the period of time is longer than if there is a minor pressure difference. The first period may end when pressure equalization is obtained, there is a predefined pressure difference or preferably just before the flow in the dispense flow path 10 is estimated to be less than the flow possible to deliver by the compressor 17 of compressor module 2a. In this way the fastest refueling can be established. The first period is terminated by a control signal to the relevant valves e.g. from the central controller 5, the local controller 4a or the dispenser module controller 18 based on temperature, pressure or flow measurements made in/at the supply storage 1a, flow path 10a and/or pressure in the vehicle vessel 14a. In this example, the dispenser controller 18a is receiving the relevant measurements and based hereon, controlling the relevant valves 6. The measurements may include pressure and temperature at the supply storage 1a and preferably also the same parameters measured in the vehicle vessel 14a.

More specific the refueling made during the first part/time follows the following principle. The vessel 13 of any of the supply storages 1 having a pressure above the pressure of the vehicle vessel 14a is first pressure equalized with the vehicle vessel 14a. The pressure equalization is made between the vehicle vessel 14a and the vessel 13 of any of the supply storages 1 having the lowest pressure above this new vehicle vessel pressure. This principle is followed until pressure equalization is has been made between the vessel 13 of any of the supply storages 1 having the highest pressure and the vehicle vessel 14a. It should be noted, that this principle can include vessels 13 which is not in used for other refuelings or consolidation. Further, if the refueling has to be made faster, cheaper, more efficient or the like, some of the bank/vessel shifts may not be made i.e. if higher jump between pressures may be desired.

After this, no refueling is made solely based on pressure differentiation in vessels 13, 14a. Therefore, during a second period of time of the refueling, the valve 6-10a is closed while valves 6-7a and 6-8a are opened. Thereby gas flow is allowed in the inlet flow path 7a to the compressor module 2a from the supply storage 1a and the outlet flow path 8a from the compressor module 2a to the dispenser 3a. During this second part of the refueling, the compressor in module 2a is increasing the inlet pressure (gas pressure in the supply storage 1a/inlet flow path) to a desired outlet pressure ending at a target pressure in the vehicle vessel 14a. When this target pressure is reached, the valves 6-7a and 6-8a are closed preferably be the dispenser controller 18 which thereby is terminating the refueling process.

It should be noted, that additional not described steps/elements of a refueling such as determining start pressure in the vehicle vessel 14a prior to initiate refueling, cooling of gas in the compressor or dispenser module 2, 3, venting hose/nozzle after end refueling, leakage check, etc. may also be part of a refueling.

At the same time as the vehicle vessel 14a is refueled as described above, from dispenser module 3a, dispenser module 3c is used for a refueling of vehicle vessel 14b. Since a refueling is ongoing from a vessel in supply storage 1a, compressor module 2a and dispenser module 3a, the dispenser controller 18b is determining if the pressure of any of the vessels of the remaining supply storages 1b-1n is sufficiently high above the pressure of gas in vehicle vessel 14b. If not, the refueling is initiated via one of the compressor modules 2b-2n. However, in this example the pressure of gas in vessel 13 of supply storage 1c is high enough to facilitate a first part refueling via the dispense flow path 10c bypassing the compressor modules 2. Therefore, the dispenser controller is opening the valve 6-10c to facilitate pressure equalization between the vessel 13 of supply storage 1c and vehicle vessel 14b. Following the above principle, when the pressure in the vessel 13 of supply storage 1c and in the vehicle vessel 14b is within a determined range, pressure equalization between another vessel 13 of another (not in use) vessel 13 of the same 1c or another supply storage and the vehicle vessel 14b is initiated. As above, after refueling by pressure consolidation, the refueling switch to filling via a compressor module 2. In this example, the compressor module 2c is used with inlet flow path 7b from supply storage 1b and outlet flow path 8c to dispenser 3c. This configuration is determined e.g. based on availability, pressure, temperature, price, hours of operation, etc.

As mentioned with respect to FIG. 2, only two of multiple different configurations between the modules are illustrated. The two illustrated configurations can easily be operated simultaneously. Further refuelings/consolidations may also be made simultaneous to the two above described refuelings.

The second main control strategy is pressure consolidation, which means ensuring a desired pressure in the individual vessels 13 of the supply storage 1 and thereby in the supply storages 1 as such. A non-limiting example of configuration of flow paths necessary for pressure consolidation is illustrated on FIG. 3 and in this embodiment, the supply storages 1 are defined as medium pressure storages which in this embodiment defines a maximum pressure of 500 bar of the vessels 13. As mentioned, the purpose of pressure consolidation is firstly to increase the pressure in one or more vessels 13 of a supply storage 1 and secondly to decrease/emptying one or more vessels 13 of a supply storage 1. One advantage of the first is to increase the first time period of a refueling where the compressor is bypassed and one advantage of the second is to increase efficiency of dump off or having as much gas pressurized to a determined pressure as possible in the large-scale refueling station as such.

Figure 3:
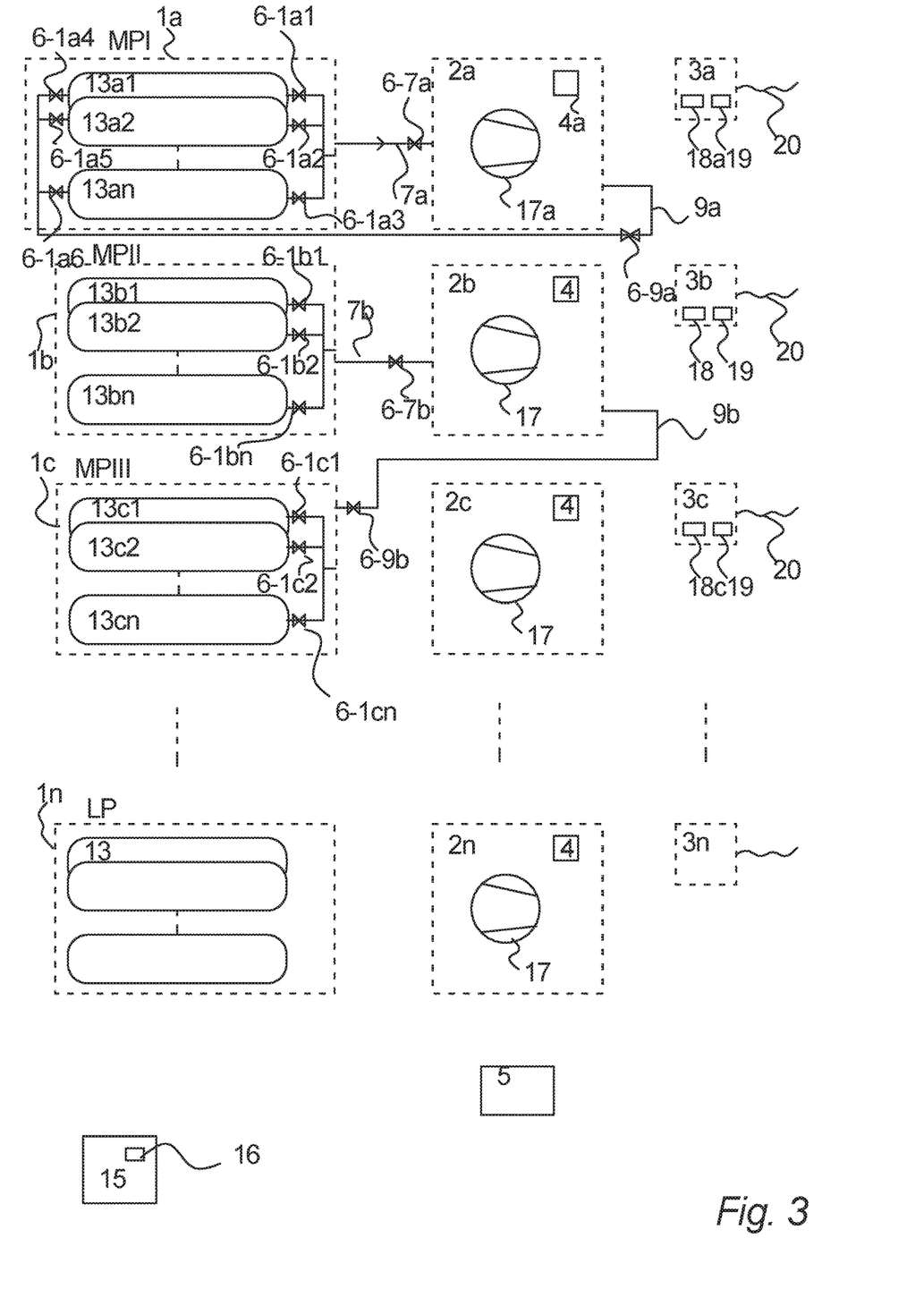

On FIG. 3 the vessels 13b1-13bn of the second supply storage 1b is emptied into the vessels 13c1-13cn of the third supply storage 1c. Hence by opening valve 6-7b and valve 6-9b the inlet and outlet flow paths 7b, 9b are opened so that the compressor of module 2b can pressurize the gas from the inlet pressure in the second supply storage 1b to the desired pressure in the third supply storage 1c. One vessel 13 at the time is emptied/filled during the pressure consolidation and which vessel 13 that is source and target vessel 13 inside the individual supply storages 1 is determined by valves 61b1-11bn of the second supply storage 1b and valves 61c1-11cn of the third supply storage 1c.

This pressure consolidation can be made simultaneously with the refuelings described above with reference to FIG. 2. In particular, when the first part of the refueling of vehicle vessel 14b is ended, the supply storage 1b is available and since compressor module 2b, and supply storage 1c is also available the consolidation can be made at the same time as vehicle vessels 14a, 14b are refueled. It should be noted, that even if the vehicle vessel 14b is refueled e.g. from vessel 13b1, vessel 13b2 can be consolidated as described with reference to FIG. 3 due to the flexible design including the control of the many valves 6. As mentioned, the valves 6 can be controlled by the any of the mentioned controllers 4, 5, 16, 18 e.g. based on reference values, threshold values, etc. compared to measurement/estimations of pressure in the respective vessels 13.

The third main control strategy is illustrated with reference to FIG. 4. On FIG. 4, the supply storage 1n is a low-pressure storage supplied with gas from the hydrogen production system 15 via the first supply flow path 11. If/when the pressure of all vessels 13n1-13nn has reached 200 bar, the produced hydrogen may be conducted to vessels 13 of other supply storages having a pressure below 200 bar. Alternatively, the produced gas may be supplied to an available compressor module in this case module 2n via the second supply flow path 12. From the compressor module 2n, via the outlet flow path 8n, the pressurized gas from the production system 15 is delivered to vessels 13 of supply storages 1 having a pressure below the (in this example defined) medium pressure threshold value of 500 bar (if they are not in use for refueling).

Figure 4:
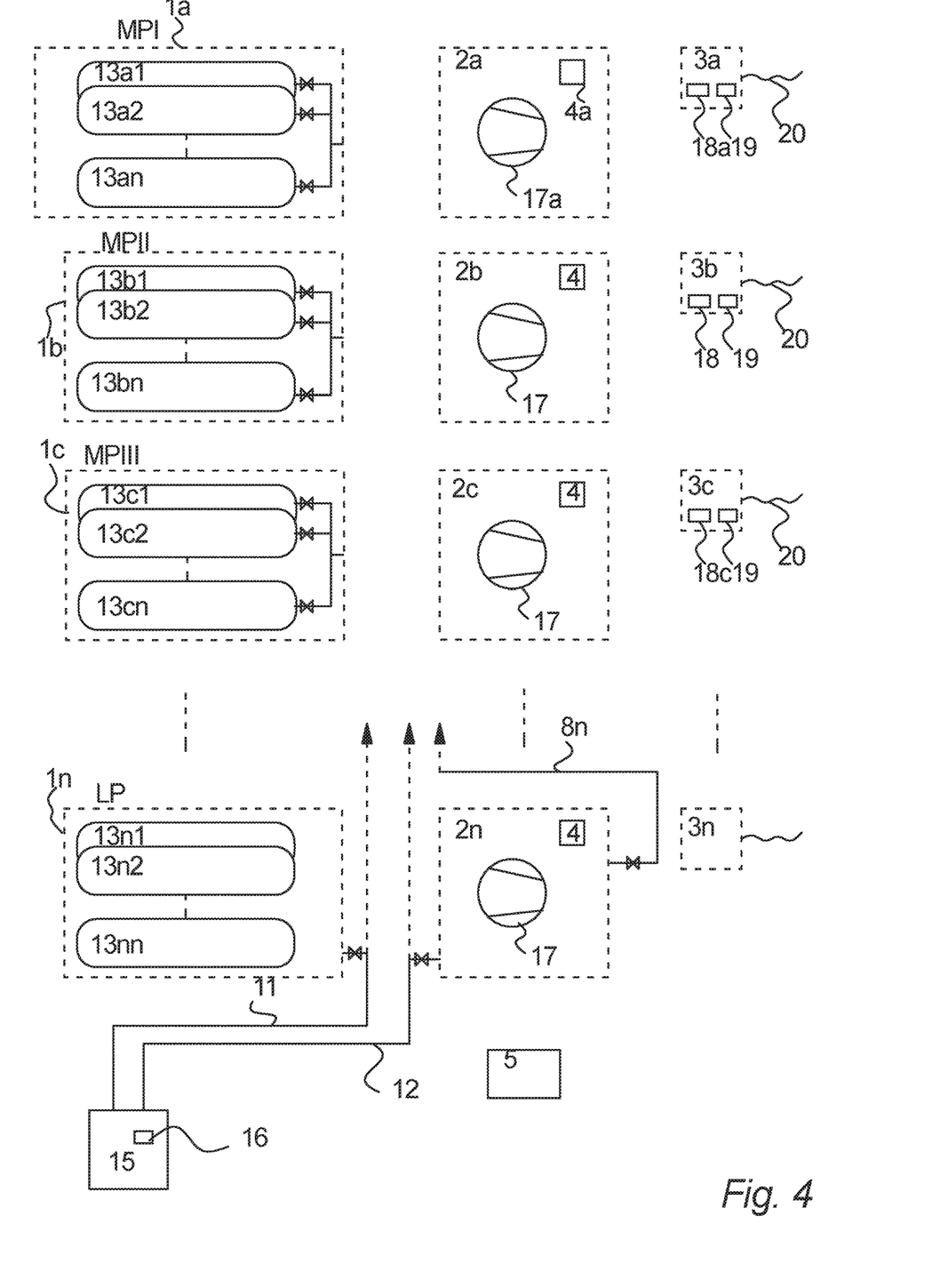

The main purpose of the third of the main control strategies are to distribute the hydrogen gas produced by the hydrogen production system 15 or delivered by e.g. a truck trailer and stored in the low-pressure supply storage 1n of FIG. 4 from the low-pressure supply storage to the medium/high-pressure storages.

The disclosure is particularly advantages in that one or more of each of the individual main control strategies can be executed simultaneously in that by the control of the valves 6 flow of hydrogen gas is allowed in at least two but preferably three, four, five, six, seven, eight, nine ten or even more of the flow paths 7, 8, 9, 10, 11, 12 simultaneously depending number of modules 1, 2, 3 of the large-scale refueling stations. When all compressor modules 2 are in used, at least the inlet flow path 7 and one of the outlet flow path 8 or consolidation flow path 9 may be in used per compressor. In addition, hereto a number of dispense flow paths 10 may be in use plus the first supply flow path 11, hence between 30% and 50% of the flow paths may be in uses simultaneously.

All the above required control of valves 6, compressors 2, dispensers 3, etc. may at least indirectly controlled by the central controller 5 sending a reference value to be used locally by the local controller 4 and dispenser controller 18 to control the position of the plurality of valves 6 and thereby the configuration mentioned above including the flow path 7, 8, 9, 10, 11, 12 between the supply storages 1 (and vessels 13 hereof), compressor modules 2, the dispensers 3 and the hydrogen production system 15.

As mentioned above, the control of the large-scale refueling station can be controlled according to as least three main control strategies. The first focus on servicing users i.e. facilitating refueling of vehicle vessels 14, the second focus on preparing for future refuelings i.e. consolidating pressure in the vessels 13 of the supply storages 1 and the third focus on distributing produced hydrogen from the low-pressure storage to the other storages. The large-scale refueling station may be controlled based on a merge of both the first and the second control strategy based on current situation and predicted future situation. In addition, the following can be taking into account when controlling the large-scale refueling station.

If a vessel 13, supply storage 1, compressor module 2, dispenser 3, valve 6, flow paths, electrolyser 15 or other components of the large-scale refueling station needs maintenance, such module can be disregard in the operation and thereby the operation of the remaining parts/modules can be continue during such maintenance.

To reduce the cost of the production of hydrogen, preferably by the electrolyser 15, the production of hydrogen gas is preferably done while the prices of energy available on the utility grid is as low as possible. Of course, the main object is to ensure enough hydrogen in the supply storages 1 to facilitate the needed number of refuelings no matter energy price. However, when the amount of hydrogen is above a defined level (referred to as plant pressure threshold) of usage of the total capacity of the supply storage vessels 13 such as above 25%, preferably above 50%, most preferably above 75%, the production can be made with respect to energy price to reduce the overall operation cost of the large-scale refueling station. In practice, as much of the hydrogen as possible is therefore produced during night time where energy price typically is lower.

As mentioned, the compressors 17 are preferably variable speed compressors. This means that they can be operated between standstill and nominal speed in dependent of the electric voltage/frequency applied. Accordingly, at low speed the energy consumption (and thereby cost of operation of the compressor) is lower than when the compressor 17 is operated at full speed/nominal speed.

The flexibility added by the variable speed compressors 17 leads to a reduction of the overall operation costs of the large-scale refueling station. This is at least partly because, when the pressure in the vessels 13 of the supply storages 1 (preferably the medium pressure storages) are sufficient, then pressure consolidation can be facilitated at reduced speed of the compressor leading to reduced noise and cost. A further example of operation of the compressor 17 with variable speed is if pressure in the medium pressure supply storages are sufficient with respect to the expected refuelings during the next couple of hours.

The main controller 5 or hydrogen production system controller 16 may initiate production of hydrogen from the hydrogen production system 15 if the system is ready and the produced hydrogen can be delivered to the low-pressure storage or via a compressor 17 to a medium/high-pressure storage or in a vehicle vessel 14.

The main controller 5 preferably receives information of energy price e.g. from grid energy marked place to be able to determine when to consolidation and/or produce hydrogen if capacity is available in that refuelings are always highest priority. Further, the main controller may determine when maintenance of a module has to be made and, in this way, bypass such module. Control signals to valves 6 and local controllers 4, 16, 18 may include open/close valve signal and information of purpose of operation of compressor 17. If high-pressure hydrogen is needed to a refueling, the local controller 4, 18 may also control the cooling system/dispenser cooling system so that the hydrogen is entering the vehicle vessel 14 with a desired temperature. Other relevant and necessary control to conduct a refueling is also controlled by the local controller 4, 18.

Note that large-scale hydrogen refueling station 21 should be understood as or the term could be replaced by a hydrogen refueling station. Such hydrogen refueling station comprises at least one supply storage 1 comprising a plurality of individual vessels, at least two compressor modules 2 (also sometimes referred to as station modules), two dispenser modules 3 each having one or more nozzles connected thereto via a hose 20 and a in an exemplary embodiment also a hydrogen production system A further example of such large-scale hydrogen refueling station is illustrated on FIG. 5.

FIG. 5 illustrates elements facilitating hydrogen production together referred to as hydrogen production system 15 and elements facilitating refueling of vehicles and tube trailers i.e. large-scale hydrogen refueling system 21. It is noted that the hydrogen production system 15 may be included in the elements referred to as large-scale refueling station 21.

As mentioned, modules of the large-scale refueling station are mutually connected. This however does not necessarily imply that a pipe is connecting each vessel 13 and each compressor module. Instead, the number of pipes is reduced where possible while maintaining the flexibility of simultaneous operation of different tasks. Accordingly, as illustrated on FIG. 5, the several flow paths can be implemented as one pipe and the position of the valves 6 determines the type of flow path. Hence, the same pipe can at different points in time be used as different types of flow paths.

The elements of the hydrogen production system 15 includes a production controller 22, production compressor 25, production cooling system 27, electrolyser 24, purification unit 26, high/low voltage supply 23, 31 and nitrogen supply 28. Further a central cooling system 30 may assist in cooling elements of the hydrogen production system 15. The hydrogen production system 15 works in conventional manners and is therefore not described in further details in that a skilled person would be able to build and operate the production system 15 based on the elements illustrated.

The elements of the large-scale hydrogen refueling station 21 may as mentioned include the production system 15. No matter if the production system 15 is included or not, the following elements are included in the large-scale hydrogen refueling station. At least one supply storage 1 comprising a plurality of vessels, a plurality of station modules 2 and a plurality of dispenser 3 each having one or more nozzles. Further, a supervisory and monitoring system 5 also referred to as central controller is preferably part of the large-scale hydrogen refueling system. As illustrated, only one supply storage 1 is illustrated, however more can be added if more capacity is needed.

Some elements such as power supply (high or low) 31, central cooling system 30 and instrument air supply 29 may be used by several elements illustrated on FIG. 5. The instrument air may for example be used to activate and keep valves in a desired position or state. Hence, if the valves 6 are controlled by air, the instrument air supply 29 may be connected to elements having valves 6. It is noted that valves may be controlled by other means than air even though air is preferred when working with hydrogen. The central cooling system 30 may be connected to the electrolyser power supply, electrolyser, compressors, purification unit(s), etc. Note that even though only one purification unit is illustrated, several may be needed. This is also true for the rest of the elements that another number of a particular element is needed than what is illustrated on FIG. 5. Finally, the electric switchgear 31 may be connected to the production control system, the stations modules process controller, instrument air supply and central cooling system As illustrated, the fluid connections between elements of FIG. 5 is single lines, however it is clear from the above description that several independent pipes between one or more elements are required to exploit the full potential of the large-scale refueling station 21. The arrows indicate possible direction of flow of fluid in the pipes. If e.g. a station module 2 is both refueling a vehicle 14/tube trailer 32 and performing pressure consolidation, more than one pipe is required between station module 2 and supply storage 1. Each of the stations modules 2 are in the exemplary embodiment illustrated on FIG. 5 connected to the same supply storage 1. The stipulated lines illustrate data and/or electric communication. Several elements are illustrated with a short-stipulated line not connected to another element, this line serves to indicate that that element may communicate with other elements. Note that this is not necessarily the case, and also note that elements without the short-stipulated line may communicate to other elements.

Further, it is noted, that the dispenser may facilitate refueling of heavy-duty vehicles such as trucks, light-duty vehicles such as cars and tube trailers that can be used to deliver hydrogen gas to other hydrogen refueling stations or other industries using hydrogen. In the embodiment where tube trailers are being filled, the stations modules (2e, 2n on FIG. 5) needed could be referred to as low-pressure modules. This is opposite stations modules (2a-2d on FIG. 5) which are referred to as high-pressure modules. This is because the pressure is typically between 350 and 700 at 100% state of charge of vehicle tanks whereas the tube trailers are typically filled to a pressure below 35 bars. With this said, pressure of tube trailers may be up to 600 bar and in such situation, the tube trailer would have to be filled at a so-called high-pressure module.

Looking at the station modules 2a-2d used for refueling of vehicles these are connected to two or three dispenser 3. Note that other number of dispensers could also be connected to the station module. As mentioned, one station module is able to perform pressure consolidation and refuel from one or more dispensers simultaneously. This is true at least when the refueling is in the cascade refueling mode i.e. when pressure in the supply storage vessels 13 are higher than the pressure in the vehicle tank. However, if the refueling process is in a direct fill mode, refueling is prioritized over pressure consolidation and the compressor of the station module will be used for refueling.

In an exemplary embodiment, the valves 6 controlling the flow of hydrogen in the pipes of the large-scale refueling system 21 is located at the station modules 2 and their position (open or closed) is controlled by the local controllers 4 of the station modules 2. This is advantageous in that based on information of pressure in the vessels of the supply storage 13, the individual station modules 2 can operate independently and is therefore not depending on other station modules 2 nor on failure in a central controller. The information of pressure, temperature, etc. is provided to the local controllers 4 of the stations modules 2 from sensors/sensor systems of the supply storage 1 denoted 33 in FIG. 5. This information can be provided upon request from the local controllers 4.

The supervision system 5 may receive the information that a vehicle is approaching and possibly also type including volume of vessel, current state of charge, etc. Based on information of current refuelings at the large-scale refueling station 21, the supervision system 5 can identify one or more dispensers that is available. The identified dispenser can be communicated to the driver in form of a light at the dispenser or via data communication to the vehicle or to the driver's smartphone.

The supervision system 5 may identify a dispenser based on different strategies including an equal wear strategy that strives to ensure equal wear of dispensers and stations modules. Alternatively, one dispenser can be kept out of rotation if e.g. it is failing or not fully operable.

As mentioned, a refueling is controlled locally by the local controllers. Hence, the local controller receives requests or establishes requests of flow of hydrogen gas in different communication paths at different times and pressures. The local controller keeps track of these requests and is able to make a prioritizing of the requests (e.g. fueling over pressure consolidation). Hence, based on the received requests, the local controller is able to establish the different communication flow paths via control of valves at the right time including priority of the use of the compressor.

It should be mentioned that the individual vessels 13 of the supply storage 1 preferably is equipped with a valve that can be used for service and/or a safety valve that opens if pressure increases above a certain threshold value defined by the type of vessel. Further, it should be mentioned, that the individual vessels may be grouped and as an example may constitute one or more 200 bar storages and several vessels may be grouped to constitute one or more 500 bar storages.

Due to the fact that only one supply storage 1 is included in the large-scale hydrogen refueling station 21 illustrated on FIG. 5, each station module 2 has the same input pressure and hence the same starting point. Therefore, the driver of a vehicle can select any dispenser and expect the vehicle to be refueled equally fast. With this said the drive is advised to select a dispenser that is connected to a station module that is not already used to refuel a vehicle. This is because that if a compressor of a station module should end up in provide compressed hydrogen gas for direct fill at two dispensers, the refueling time may be prolonged.

To avoid this, the vehicle approaching the large-scale refueling station, may be identified. This can be done by several different technologies such as near field communication, number plate scanner, Bluetooth, GPS, etc. it is not important how.

The supervision system 5 preferably at least keeps track on refuelings that is requested and initiated. A request can be made by a driver activating a dispenser via a user interface or simply by lifting the nozzle. When a request for a refueling is made, the request may be queued in a memory of at least the control system of the compressor module connected to the dispenser. The local controller then, for the dispensers connected to the compressor module, based on the requests for hydrogen gas prioritizes the order in which the requests can be complied with. Complying with a request is establishing a fluid communication e.g. between a vessel 13 and dispenser/vehicle tank 14. Fluid communication could be establishing a start pulse to determine start pressure in vehicle tank, cascade refueling, direct fueling, etc.

It should be mentioned that the local controllers may communicate with the supervision system. Such communication may include status, turn on and turn off commands, etc. The supervision system may estimate that hydrogen needs to be produced or pressure needs to be increased in one or more vessels 13 of the supply storage 1 to maintain a certain minimum mass of hydrogen gas at a certain pressure. Hence if it is estimated that a refueling will bring e.g. pressure in a vessel 13 below a threshold value, the supervisory system may initiate relevant action(s) to increase the pressure in this vessel at the same time as one or more refuelings of vehicles are carried out.

Alternatively, since all stations modules receives information of pressure in the vessels 13 of the supply storage, those that are available can automatically begin to perform pressure consolidation. In an exemplary embodiment the station modules are prioritized or synchronized to optimize control and to avoid that two stations modules are starting pressure consolidation when only one is needed. This prioritization or synchronization may be established by the supervisory system or by different threshold values assigned to the different station modules to be meet before starting e.g. to perform pressure consolidation.

Further, it should be mentioned that if for some reason requests cannot be executed in the order the requests are registered or a high priority request is received, the queue of request can be changed from the supervisory system.

Further, it should be mentioned, that in the situation where the supervisory system have the complete overview of the large-scale refueling system 21 preferably also including the production system 15 it may initiate certain actions for the stations modules e.g. how to use idle time i.e. time when it is not used in refueling. Pressure configuration is for example one example, but also service, building up cooling capacity, hydrogen production, etc. can be made during such idle time.

Further, it should be mentioned that the supervisory system also may receive information from the vessels 13 of the supply storage 1. This information can be used e.g. to prioritize which of the vessels that should be used for refueling and which should be used for pressure consolidation (source vessel and end vessel). This can be done to ensure more or less same wear of each vessel or the opposite to use one particular vessel more if e.g. it is planned to be replaced.

Further, it should be mentioned that the supervisory system also may overrule local controllers and thereby dictate a certain pressure, flow, temperature, etc. to a particular dispenser upon request from e.g. a user or a dispenser.

From the above, it is now clear that the present disclosure relates to a large-scale hydrogen refueling station comprising a plurality of storages 1, compressor modules 2 including compressors 17, dispensers 3 (maybe including dispenser cooling system) and at least one hydrogen production system 15. A main controller 5 may partially control/provide control reference values related to price, maintenance, when the production of hydrogen should be initiated e.g. with respect to energy price, storage capacity or the like. The controller 16 of the hydrogen production system 15 then produces hydrogen according to the received reference or e.g. pressure/temperature of the low-pressure storage. The dispenser controller 18 may control valve 6 relevant of a refueling as well as dispenser cooling system 19. The local controller 4 may control the compressor module 2.

All control is made based on input from external sensors or data processors such as pressure sensor, temperature sensors, central servers, external data providers, etc. these external data contributors are not illustrated on the Figures.

In an aspect, the main controller 5 is controlling valves 6 and sends control references to the compressor modules 2/dispenser module 3 to facilitate either a pressure consolidation, a refueling of a vehicle vessel 14 or moving of gas from low to medium/high-pressure storage.

As mentioned above, the main controller 5, local controllers 4, dispenser controllers 18, hydrogen production system controller 16 is together or individually able to facilitate several consolidations and several refuelings at the same time and even also at the same time facilitate production of hydrogen. To ensure as low operation costs as possible, the compressors 17 are variable speed compressors which can reduce energy consumption (and noise) when reducing speed. Further, the operation of compressors 17 and the hydrogen producing system 15 may be controlled with respect to energy price of power received from the utility grid.

It should be mentioned, that the large-scale refueling station might be controlled or at least partly controlled from the central controller 5. Hence, the main controller may act as a master controller whereas the local controllers and if relevant dispenser controllers may act as slave controllers. A partly control or overall control may include a prioritization of e.g. compressor modules so that two equally suitable compressor modules is informed which should initiate pressure consolidation of a vessel 13. Such overall control may as mentioned also include strategy with respect to energy price, noise, etc.

The invention claimed is:

1. A large-scale hydrogen refueling station comprising:
   a supply storage comprising a plurality of vessels,
   a plurality of compressor modules each comprising a local autonomous controller,
   three dispenser modules,
   a hydrogen production system comprising a hydrogen production system controller, and
   a local autonomous central controller disposed in communication with the local autonomous controllers,
   wherein the supply storage, the plurality of compressor modules, the dispenser modules and the hydrogen production system are mutually connected to enable a flow of hydrogen gas therebetween,
   wherein the local autonomous central controller facilitates control of valves and thereby the flow of hydrogen gas between the vessels of the supply storage, the compressor modules, the dispenser modules and/or the hydrogen production system, and
   wherein the control of the valves enable the flow of hydrogen gas in three flow paths simultaneously, thereby enabling simultaneous flow of hydrogen gas from the vessels to a first and second of said dispenser modules, the plurality of flow paths comprising:
      an inlet flow path between a first vessel of said plurality of vessels and a first compressor module of said plurality of compressor modules,
      an outlet flow path between said first compressor module and said first dispenser module, and
      a dispense flow path between a second vessel of said plurality of vessels and said second dispenser module;
   wherein the valves are further controlled to establish
      a first supply flow path between the hydrogen production system and the supply storage, and/or
      a second supply flow path between the hydrogen production system and at least one of the plurality of compressor modules,
   wherein said control of the valves facilitates flow of gas in the first supply flow path or in the second supply flow path simultaneously with flow of gas in at least one of the inlet flow path, the outlet flow path, a consolidation flow path or the dispense flow path.

2. A large-scale refueling station according to claim 1, comprising three compressor modules.

3. A large-scale refueling station according to claim 1, wherein the flow paths further comprise:
   the consolidation flow path between at least one compressor module and the supply storage,
   wherein the local autonomous central controller is controlling the valves so as to facilitate flow of gas in at least three of the inlet flow path, the outlet flow path, the consolidation flow path or the dispense flow path simultaneously.

4. A large-scale refueling station according to claim 1, wherein the local autonomous central controller, during the first part of a refueling, is configured to control the valves of a particular compressor module to facilitate flow of hydrogen via the dispensing flow path from a vessel of the supply storage to a dispenser module associated with the specific compressor module and furthermore configured to control the compressor and the valves to facilitate flow of hydrogen in the inlet flow path and in the consolidation path and thereby facilitating pressure consolidation of a vessel and refueling of a vehicle vessel simultaneously.

5. A large-scale refueling station according to claim 1, wherein the central autonomous controller is controlling the valves so that a first consolidation flow path is connecting a second compressor module to a third vessel of said supply storage.

6. A large-scale refueling station according to claim 1, wherein the first vessel serves as gas input to the inlet flow path simultaneously with a second vessel of the supply storage serving as gas receiver of the consolidation flow path from a second compressor module.

7. A large-scale refueling station according to claim 1, wherein the hydrogen production system is producing hydrogen when the pressure in a vessel of the supply storage is below a plant pressure threshold.

8. A large-scale refueling station according claim 1, wherein the hydrogen production system is producing hydrogen when an energy price is below an energy price threshold value if the pressure in all supply storage vessels is above a plant pressure threshold.

9. A large-scale refueling station according to claim 1, wherein a first part of a refueling is made directly from the supply storage and a second part of the refueling is made via one of the plurality of compressor modules, wherein a shift between the first and the second part is made when a flow in the dispense flow path is estimated to be lower than a flow generated by the compressor module in the output flow path.

10. A large-scale refueling station according to claim 1, wherein the simultaneous flow in the three flow paths is controlled by one of the local autonomous controllers so as to enable one compressor module to perform pressure consolidation of a vessel simultaneously with refueling a vehicle tank.

11. A large-scale refueling station according to claim 1, wherein all valves controllable by the local autonomous central controller required to control the flow in at least three of the flow paths is physically located at part of the compressor module.

12. A large-scale refueling station according to claim 1, wherein the ratio of compressor modules to supply storage is at least 3 to 1.

13. A large-scale refueling station according claim 1, wherein a vehicle approaching the large-scale refueling station is identified and guided to an available dispenser by a master controller.

14. A large-scale refueling station according to claim 13, wherein the identification includes registering at least one of the following: vehicle type, vehicle tank size, state of charge of a vehicle tank, pressure of gas in the vehicle tank and temperature of the vehicle tank.

15. A method of refueling a vehicle vessel from a large-scale refueling station comprising a supply storage comprising a plurality of vessels, a plurality of compressor modules each comprising a local autonomous controller, three dispenser modules, a hydrogen production system comprising a hydrogen production system controller, and a local autonomous central controller disposed in communication with the local controllers,
  wherein the supply storage, the plurality of compressor modules, the dispenser modules and the hydrogen production system are mutually connected to enable a flow of hydrogen gas therebetween, the method comprising the following steps:
    connecting a first vehicle vessel to a first dispenser module,
    starting the refueling from a user interface,
    initiating a flow of hydrogen gas from a vessel of said supply storage via a dispense flow path during a first part of the refueling,
    continuing the flow of hydrogen via an inlet flow path, compressor module, and an outlet flow path during a second part of the refueling, and
    disconnecting the dispenser module from the vehicle vessel when a target pressure is reached,
  wherein said initiating comprises activating the local autonomous controller of the compressor module associated with the first dispensing module to which the vehicle vessel is connected based on a local autonomous controller change status of one or more valves to facilitate said flow of hydrogen gas to said first dispenser module via said dispense flow path during the first part of the refueling and via said inlet flow path, compressor module and an outlet flow path during the second part of the refueling and, simultaneous with said second part of the refueling of said first vehicle vessel, a change status of one or more valves allows a flow of gas from a vessel of said supply storage via said dispense flow path to a second dispenser module fluidly connected to a second vehicle vessel;
  wherein the method further comprises the steps of controlling the valves to establish
    a first supply flow path between the hydrogen production system and the supply storage, and/or
    a second supply flow path between the hydrogen production system and at least one of the plurality of compressor modules,
  wherein said control of the valves facilitates flow of gas in the first supply flow path or in the second supply flow path simultaneously with flow of gas in at least one of the inlet flow path, the outlet flow path, a consolidation flow path or the dispense flow path.

16. A method according to claim 15, wherein the local autonomous controller, during the first part of the refueling furthermore controls the valves and the compressor to perform pressure consolidation of a vessel.

17. A method according to claim 15, wherein during the second part of the refueling a first compressor module is used for refueling of a vehicle vessel and simultaneously a second compressor is used for pressure consolidation between vessels of the supply storage.

18. A method according to claim 15, wherein simultaneously a third compressor module is used for moving pressure from a low-pressure storage connected to the hydrogen production system to a medium or high-pressure supply storage or to a vehicle vessel.

19. A method according to claim 15, wherein a simultaneous flow in at least three of the flow paths is controlled by one local autonomous controller so as to enable one compressor module to perform pressure consolidation of a vessel of the supply storage simultaneously with refueling a vehicle tank.

* * * * *